(12) United States Patent
Schudt et al.

(10) Patent No.: US 11,488,755 B2
(45) Date of Patent: Nov. 1, 2022

(54) ELECTROMAGNETIC ACTUATING DEVICE

(71) Applicant: Robert Bosch GmbH, Stuttgart (DE)

(72) Inventors: Klaus Schudt, Nordheim (DE);
Mehmet-Fatih Sen, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 273 days.

(21) Appl. No.: 16/541,440

(22) Filed: Aug. 15, 2019

(65) Prior Publication Data

US 2020/0203105 A1 Jun. 25, 2020

(30) Foreign Application Priority Data

Dec. 20, 2018 (DE) .......................... 102018222610.5

(51) Int. Cl.
*H01F 7/08* (2006.01)
*H01H 50/18* (2006.01)

(52) U.S. Cl.
CPC ............. *H01F 7/081* (2013.01); *H01H 50/18* (2013.01); *H01F 2007/085* (2013.01)

(58) Field of Classification Search
CPC .. H01H 50/18; H01H 49/00; H01F 2007/085; H01F 7/081; H01F 7/1607; F16K 31/0696; F16K 31/0675
See application file for complete search history.

(56) References Cited

U.S. PATENT DOCUMENTS

| 8,854,164 | B2* | 10/2014 | Fleischer | H01F 7/1607 |
| | | | | 335/220 |
| 2006/0255188 | A1* | 11/2006 | Bechler | H01F 7/1607 |
| | | | | 239/585.3 |
| 2008/0295806 | A1* | 12/2008 | Chang | F02M 61/168 |
| | | | | 123/470 |
| 2010/0127197 | A1* | 5/2010 | Fleischer | F16K 31/0655 |
| | | | | 251/129.15 |
| 2017/0370339 | A1* | 12/2017 | Deland | F16L 37/28 |
| 2018/0094741 | A1* | 4/2018 | Paulus | F16K 31/0675 |

FOREIGN PATENT DOCUMENTS

| DE | 102005030657 B3 | 11/2006 | |
| WO | WO-2017153190 A1 * | 9/2017 | ........... H01F 7/1607 |

* cited by examiner

*Primary Examiner* — Mohamad A Musleh
(74) *Attorney, Agent, or Firm* — Norton Rose Fulbright US LLP; Gerard Messina

(57) ABSTRACT

An electromagnetic actuating device includes a sleeve, an armature situated radially inside the sleeve, and an electromagnetic coil situated radially outside the sleeve, the armature having a first armature end face on one end and a second armature end face on the opposite end. The sleeve has a channel on or in the sleeve wall, which extends in the longitudinal direction of the sleeve and forms a fluid connection between the armature end faces.

20 Claims, 4 Drawing Sheets

ELECTROMAGNETIC ACTUATING DEVICE

CROSS-REFERENCE TO RELATED APPLICATIONS

The present application claims priority under 35 U.S.C. § 119 to DE 10 2018 222 610.5, filed in the Federal Republic of Germany on Dec. 20, 2018, the content of which is hereby incorporated by reference herein in its entirety.

FIELD OF THE INVENTION

The present invention relates to an electromagnetic actuating device.

BACKGROUND

In automatic transmissions for automobiles, hydraulically operated clutches are used for gear change operations, the hydraulic pressure at the clutches being adjusted by hydraulic slide valves. Slide valves can be operated via a pilot valve (pilot control) or directly via an electromagnetic actuating device. To obtain damping, such actuating devices are filled with oil, and oil is displaced from the increasingly smaller space upstream of the armature by a movement of the armature of the actuating device and pumped via an overflow channel into the enlarging space downstream from the armature. Such a pumping operation results in damping of the armature movement. Since transmission oil has a high air absorption capacity, the problem of a fluctuating oil level in the armature space arises in practice, which makes constant damping more difficult. The overflow channels, for example, are developed as bore holes in the armature, as illustrated in DE 10 2005 030 657 A1. In addition to a complex production, this can lead to a throttled magnetic flux and reduced magnetic forces due to the reduction of the cross-section of the armature.

SUMMARY

The problem on which the present invention is based is solved by an electromagnetic actuating according to example embodiments of the present invention.

According to an example embodiment of the present invention, an electromagnetic actuating device includes a sleeve (flux sleeve), an armature (solenoid armature) situated radially inside the sleeve, and an electromagnetic coil situated radially outside the sleeve. The armature can be directly or indirectly guided within the sleeve, for instance by a slide fit. The armature is able to be displaced along its longitudinal direction in the electromagnetic actuating device by activating the electromagnetic coil. This corresponds to the classic arrangement of an electromagnetic actuating device.

At one end, the armature has a first armature end face, and on the opposite end it has a second armature end face. The sleeve is provided with a channel on or in the sleeve wall, the channel extending in the longitudinal direction of the sleeve and being used in order to establish or form a fluid connection (hydraulic connection) between the armature end faces.

The channel (overflow channel) in the sleeve allows for an overflow of oil between the armature end faces during an armature movement, while an adverse effect on the magnetic circuit is largely avoided. No development of overflow channels in the armature is required. The production is simplified as a result and a weakening of the magnetic circuit is avoided for the most part. This contributes to a cost-effective magnet design.

The sleeve (flux sleeve) can have an essentially cylindrical cross-section. It is of course understood that "essentially cylindrical" includes that the sleeve can encompass collars, steps, grooves, variations in the wall thickness, etc. but has a cylindrical or pipe-shaped development as a whole. The sleeve can be secured in the actuating device in a torsion-resistant manner. The armature, sleeve, and electromagnetic coil have an (axially) overlapping position relative to each other. The electromagnetic actuating device can particularly involve an electromagnetic final control element or an electromagnetic armature ("solenoid").

According to an example embodiment, the armature is able to be developed without channels, in particular without overflow channels. In other words, the armature can be devoid of bore holes or grooves that form overflow channels. This contributes to a cost-effective production and to a relatively large effective cross-sectional area of the armature.

According to an example embodiment, the sleeve can be developed by a punching and rolling process (the sleeve is punched and rolled). The base material of the sleeve can be punched out and the sleeve be brought into its essentially cylindrical shape by rolling. This is a simple and cost-effective production method by which lower wall thicknesses of the sleeve can be achieved than when using a cutting production, for instance.

According to an example embodiment, the sleeve can be developed from magnetically conductive unalloyed steel, in particular having a carbon content of less than 0.15% by mass (carbon content <0.15%). This is a magnetic material offering excellent conductivity, which contributes to a high magnetic efficiency.

According to an example embodiment, the sleeve can have an open cross-section with a longitudinal slot (ring segment), where the free ends of the sleeve wall enclose the longitudinal slot between them and thus restrict the channel in the circumferential direction, i.e., toward the channel sides. The channel therefore runs through the longitudinal slot that restricts the channel on the side. This makes it possible to easily produce a channel in the sleeve (flux sleeve). The longitudinal slot is able to be developed directly during the production (butt joint between the free ends of the sleeve wall), in particular during a production by punching and rolling. A complex additional process for producing the channel (overflow channel) is thus able to be avoided. In the radially inward direction, the channel is able to be restricted by the armature, in particular by the outside surface of the armature. In the radially outer direction, the channel can be restricted by the electromagnetic coil, in particular by the coil body of the electromagnetic coil (e.g., the inner surface).

According to an example embodiment, the channel or the longitudinal slot can have a first channel cross-section that regionally tapers to a second channel cross-section in the axial direction. Varying the channel cross-section makes it possible to influence the damping characteristics by constructively simple means. If the sleeve is punched and rolled, the contour of the free ends of the sleeve wall is easy to produce. The first channel cross-section can have a cross-sectional area of 2 percent or more (>2%) of the (pumping) armature cross-section. This cross-sectional stipulation preferably applies to 60 percent or more of the length of the channel (>60% of the channel length). An excessive damping effect is able to be avoided in this manner. The second channel cross-section can have a cross-sectional area of 0.5 to 1.5 percent (0.5%-1.5%) of the (pumping) armature cross-section. This cross-sectional stipulation preferably applies to 40 percent or less of the length of the channel (<40% of the channel length), the sums of the channel lengths jointly amounting to 100% of the channel length, and thus together correspond to the total channel length (sleeve length). This makes it possible to achieve ("diaphragm-type") temperature-independent damping. The channel can be a longitudinal slot and the channel cross-sections can therefore be slot cross-sections.

According to an example embodiment, a pole core can be provided, which is axially adjacent to the armature and has a groove that is aligned with the channel of the sleeve in a section, in particular an annular section, facing the armature. The groove in the pole core contributes to a better oil flow between the armature end faces. In this way the groove has an advantageous effect on the oil flow at the end of the armature facing the pole core, where the armature is able to be guided by the pole core. Such a guidance can be accomplished by a recess in the annular section of the pole core with which the armature engages and at which the armature is guided. An actuating element, in particular an actuating pin, can be introduced into the pole core. The pole core as such can be developed in one piece, e.g., as a turned part.

Alternatively or additionally, an inner sleeve (magnet sleeve) can be provided, which is situated radially between the sleeve (flux sleeve) and the armature, the inner sleeve having in its sleeve wall an axial slot that extends across an axial section of the inner sleeve and is aligned with the channel of the sleeve (flux sleeve). The magnetic force characteristic is able to be influenced by the inner sleeve. The exploitable lifting work of the electromagnetic actuating device can be increased. More specifically, the axial slot is developed at the end of the inner sleeve facing the first end face (on the side of the pole core). This contributes to an improved oil flow between the armature end faces. The inner sleeve is able to be produced by punching and rolling. Optionally, the inner sleeve can be latched at the butt ends (latching). Independently thereof, an axial slot (open joint) can also be developed on the other end of the inner sleeve. This has a positive effect on the oil flow between the armature end faces. In addition, joining of the inner sleeve to further components is made easier. The inner sleeve can be developed from the same material as the sleeve (flux sleeve).

Alternatively or additionally, a pole core can be provided, which has a separate pole sleeve, which is radially situated outside the pole core and at least regionally surrounds the pole core, the pole sleeve having a groove in a section facing the armature, in particular an annular section, the groove being aligned with the channel of the sleeve. This contributes to a better oil flow between the armature end faces. In addition, a relatively cost-effective production is achievable because the pole core and the pole sleeve can be separately produced, e.g., as punched parts.

According to an example embodiment, the sleeve (flux sleeve) can be secured in the actuating device in a torsion-resistant manner in such a way that the channel is situated above the armature in the direction of the force of gravity or below the armature in the direction of the force of gravity. The statements pertaining to the direction of the force of gravity are relative to the installation position of the electromagnetic actuating device, e.g., on an automatic transmission of a passenger car. The sleeve is installed in the actuating device in a torsion-resistant manner and is unable to rotate during the operation. It is therefore possible to orient the channel in such a way that it lies at the lowest point (below the armature in the direction of the force of gravity) and thus even a low oil fill level already ensures the required damping. For applications for which the damping is to be low, the channel is able to be installed at the highest point (above the armature in the direction of the force of gravity), so that even a small air cushion in the armature space ensures that the damping returns to a minimum.

According to an example embodiment, the sleeve (flux sleeve) or the inner sleeve can at least partially and preferably completely be provided with a glass cloth foil at its inner circumference, the glass foil cloth being coated with PTFE (polytetrafluoroethylene) in order to guide the armature. Positive sliding characteristics are achievable by the coated glass cloth foil as a bearing element for the armature.

As an alternative, the inner circumference of the sleeve or the inner sleeve and/or the outer circumference of the armature can at least partially and preferably completely be provided with a magnetically non-conductive coating, in particular a nickel layer or a nickel-phosphorus layer. This, too, makes it possible to achieve positive sliding characteristics.

The electromagnetic actuating device can include further components. For example, the electromagnetic actuating device can include a housing (magnet housing) in which the components of the actuating device are accommodated. On an end face, in particular the end face facing the pole core, the actuating device can be sealed by an end piece, which could be a flux disk. On the opposite end face, in particular on the end face facing away from the pole core, the actuating device can be sealed by a cover (magnet cover). For the connection of the electromagnetic actuating device, an electrical contacting is able to be provided, which is electrically connected to the electromagnetic coil, e.g., a bushing section mounted on the housing or a plug section. An actuating element such as an actuating pin is insertable into the pole core, which is guided by a through passage concentrically developed in the pole core. The actuating element can have a shaft section and a radially expanded head section via which it is resting against the inner side of the through passage on the pole core.

In the following text, example embodiments of the present invention are described with reference to the appended drawings.

DETAILED DESCRIPTION

Figure 1A:
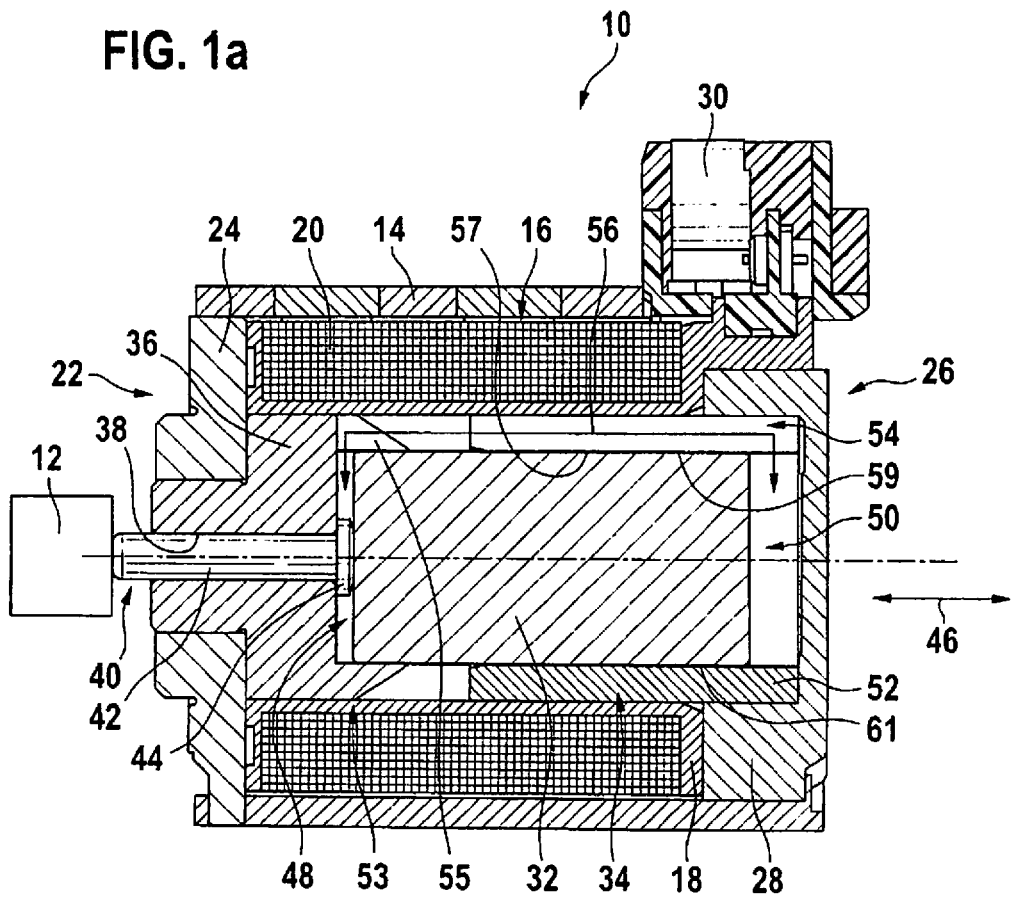
FIG. 1a illustrates a schematic section through an electromagnetic actuating device according to an example embodiment of the present invention.

FIG. 1a shows an electromagnetic actuating device 10. For instance, such an electromagnetic actuating device 10 is used in the technical field of power transmissions in motor vehicles, in particular for the purpose of controlling a clutch of an automatic transmission. To that end, for example, a hydraulic valve, which is only schematically indicated in FIG. 1a by a box provided with reference numeral 12, is actuated by electromagnetic actuating device 10.

Electromagnetic actuating device 10 has a housing 14 in which the components of electromagnetic actuating device 10 are situated. Electromagnetic actuating device 10 has an electromagnetic coil 16, which includes a coil body 18 and a winding 20. On a first end face 22, housing 14 is sealed by an end piece 24, which can be a flux disk. On a second end face 26, the housing is sealed using a cover 28, which can be a magnet cover 28. In addition, an electrical contacting 30 is provided on housing 14, which is electrically connected to electromagnetic coil 16.

Moreover, electromagnetic actuating device 10 has an armature 32 (solenoid armature), a sleeve 34 (flux sleeve), and a pole core 36. Pole core 36 is provided with a centrical through passage 38 through which an actuating element 40 is guided (actuating pin), which acts on hydraulic valve 12. Actuating element 40 can have a shaft section 42 as well as a radially expanded head section 44.

Armature 32 is situated radially inside sleeve 34. Situated radially outside sleeve 34 is an electronic coil 16. Coil 16, armature 32, and sleeve 34 at least partially overlap one another along axial direction 46. At one end, armature 32 has a first armature end face 48 (facing pole core 36), and on the opposite end, it has a second armature face end 50 (facing away from pole core 36).

On or in sleeve wall 52, sleeve 34 has a channel 54, which extends along longitudinal direction 46 of sleeve 34 and forms a fluid connection (hydraulic connection) between the armature end faces 48, 50. Pole core 36 is axially adjacent to armature 32 and has a groove 55 in a section 53 facing armature 32, in particular an annular section, which is aligned with channel 54 of sleeve 34. When coil 16 is activated, armature 32 moves along axial direction 46, e.g., in the direction of first end face 22, and a return of armature 32 can be accomplished by applying force to actuating pin 40, for instance. Through the axial movement of armature 32, an oil flow results in channel 54, which is illustrated by arrow 56. Armature 32 itself is developed without channels (without overflow channels) and thus has no bore holes or grooves.

Sleeve 34 is secured in actuating device 10 in a torsion-resistant manner in such a way that channel 54 is situated above armature 32 in the direction of the force of gravity (installation position of actuating device 10). In example embodiments that are not illustrated, sleeve 34 can be secured in actuating device 10 in a torsion-resistant manner in such a way that channel 54 is situated underneath armature 32 in the direction of the force of gravity. Sleeve 34 is illustrated separately in FIG. 1b, and channel 54 can easily be seen there. Sleeve 34 is produced by punching and rolling, which means that sleeve 34 is first punched out and then brought into its essentially cylindrical or tube-shaped form by rolling. Sleeve 34 is made from a magnetically conductive unalloyed steel, in particular with a carbon content of less than 0.15% by mass (<0.15%).

Sleeve 34 has an open cross-section including a longitudinal slot 58 (butt joint), and free ends 60, 62 include longitudinal slot 58 between them and thus restrict channel 54 in the circumferential direction, i.e., toward the sides. Put another way, sleeve 34 is developed as a ring segment including longitudinal slot 58. A restriction of channel 54 in the radially inward direction can be achieved using armature 32. A restriction of channel 54 in the radially outward direction can be accomplished by coil 16, in particular by coil body 18.

At its inner circumference 57, sleeve 34 is at least sectionally and preferably completely provided with a glass cloth foil 59 coated with PTFE for the guidance of armature 32. Positive sliding properties are able to be achieved. As an alternative, inner circumference 57 of sleeve 34, or outer circumference 61 of armature 32, can at least partially and preferably completely be provided with a magnetically non-conductive coating, this in particular being a nickel layer or a nickel-phosphorus layer.

Figure 2A:
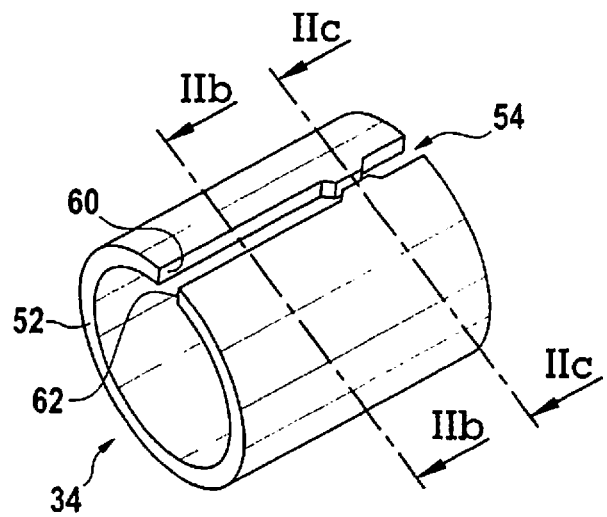
FIG. 2a illustrates a version of the sleeve of FIG. 1b according to an example embodiment of the present invention.
Figure 2B:
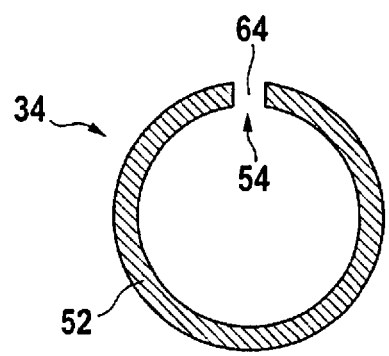
FIGS. 2b-2c are a plurality of sectional views different channel cross-sections according to an example embodiment of the present invention.
Figure 2C:
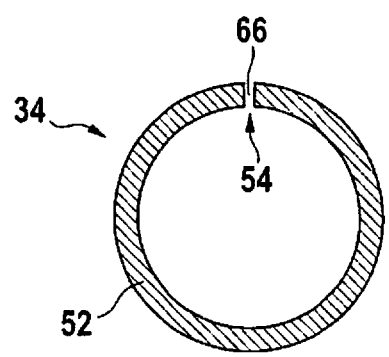

FIGS. 2a-2c show an embodiment of sleeve 34 including a channel 54, whose channel cross-section varies across the sleeve length. Thus, channel 54 has a first channel cross-section 64 (see FIG. 2b), which tapers to a second channel cross-section 66 (see FIG. 2c) in an axial section of sleeve 34. The cross-sectional areas can be selected as described above. In the current example embodiment, the region having second channel cross-section 66 is situated axially between two regions having a first channel cross-section 64 (see FIG. 2a). If sleeve 34 is developed by punching and rolling, then it is also easy to produce the varying channel cross-section by a corresponding development of the contour of free ends 60, 62.

Figure 1B:
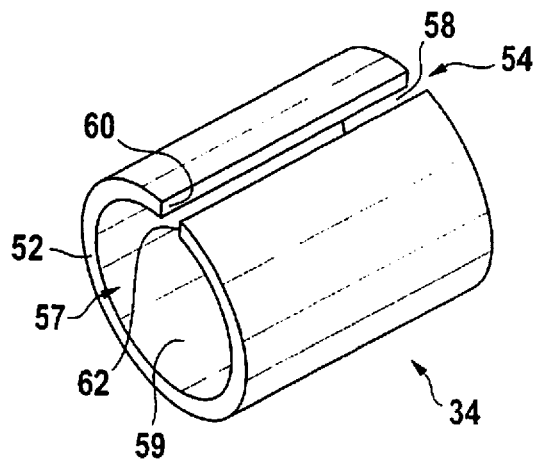
FIG. 1b schematically illustrates, in a perspective enlarged view, a sleeve of the actuating device according to an example embodiment of the present invention.
Figure 3A:
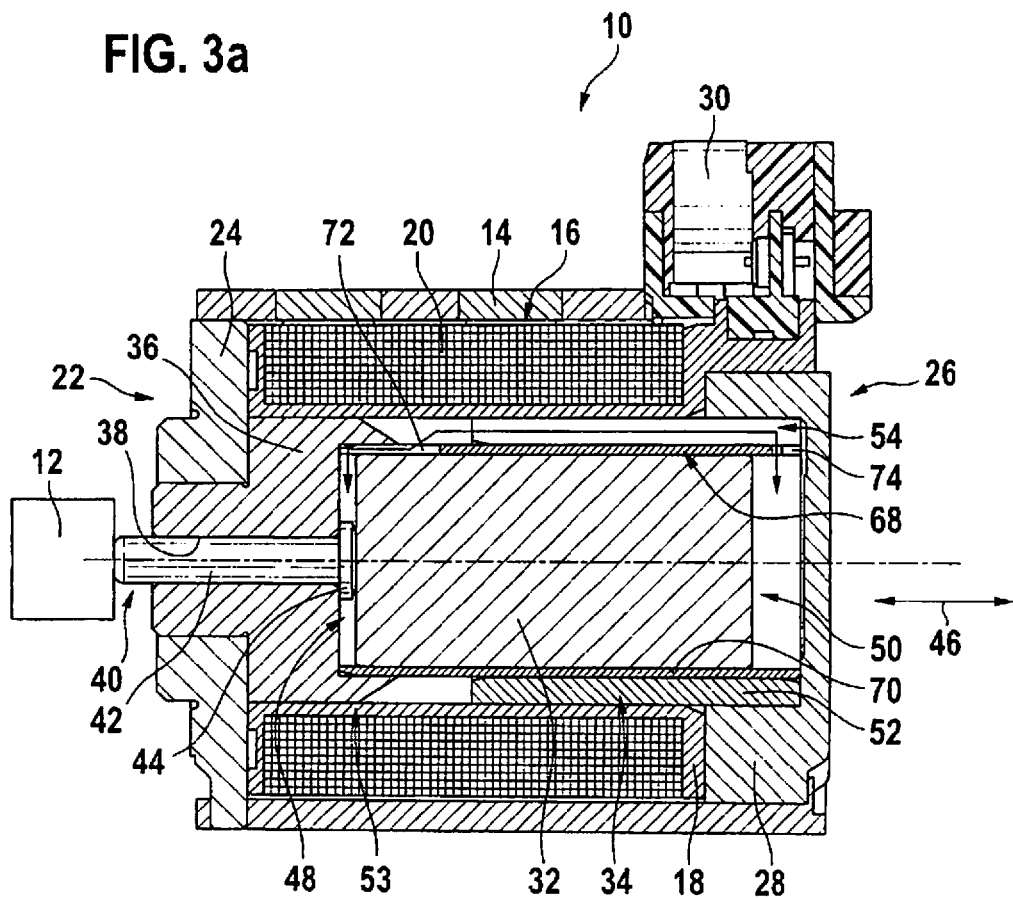
FIG. 3a schematically illustrates a cross-section of a version of the electromagnetic actuating device according to an example embodiment of the present invention.
Figure 3B:
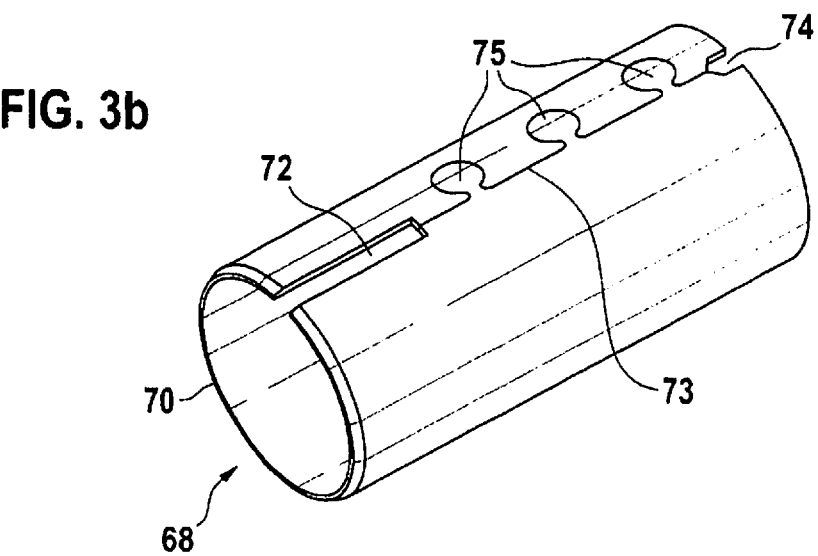
FIG. 3b is an enlarged perspective view of an intermediate sleeve of the actuating device according to an example embodiment of the present invention.

FIGS. 3a-3b show a further development of electromagnetic actuating device 10, which largely corresponds to the example embodiment described in FIGS. 1 and 2 (identical or functionally equivalent elements carry the same reference numerals). In the embodiment according to FIG. 3a-3b, an inner sleeve 68 (magnet sleeve) is provided, which is radially situated between sleeve 34 and armature 32. In its sleeve wall 70, inner sleeve 68 has an axial slot 72 that extends across an axial section of inner sleeve 68 and is aligned with channel 54 of sleeve 34. Axial slot 72 is developed on the end of inner sleeve 68 that faces first end face 22 (on the side of the pole core). Another axial slot 74, which is aligned with channel 54 of sleeve 34, is developed on the other end of inner sleeve 68. Inner sleeve 68 is produced by punching and rolling. Optionally, inner sleeve 68 can be engaged at butt ends 73 (engagement 75). Pole core 36 can optionally include a groove 55 (see FIGS. 1a-1b). In this instance, groove 55 is not actually needed for the production of the fluid connection between armature end faces 48, 50 and can thus be omitted. In order to guide armature 32, a glass cloth foil coated with PTFE (not shown) can be at least regionally and preferably completely provided at the inner circumference of inner sleeve 68. As an alternative, a magnetically non-conductive coating can be provided at least regionally and preferably completely on the inner circumference of inner sleeve 68 or on outer circumference 61 of armature 32, as described above.

Figure 4A:
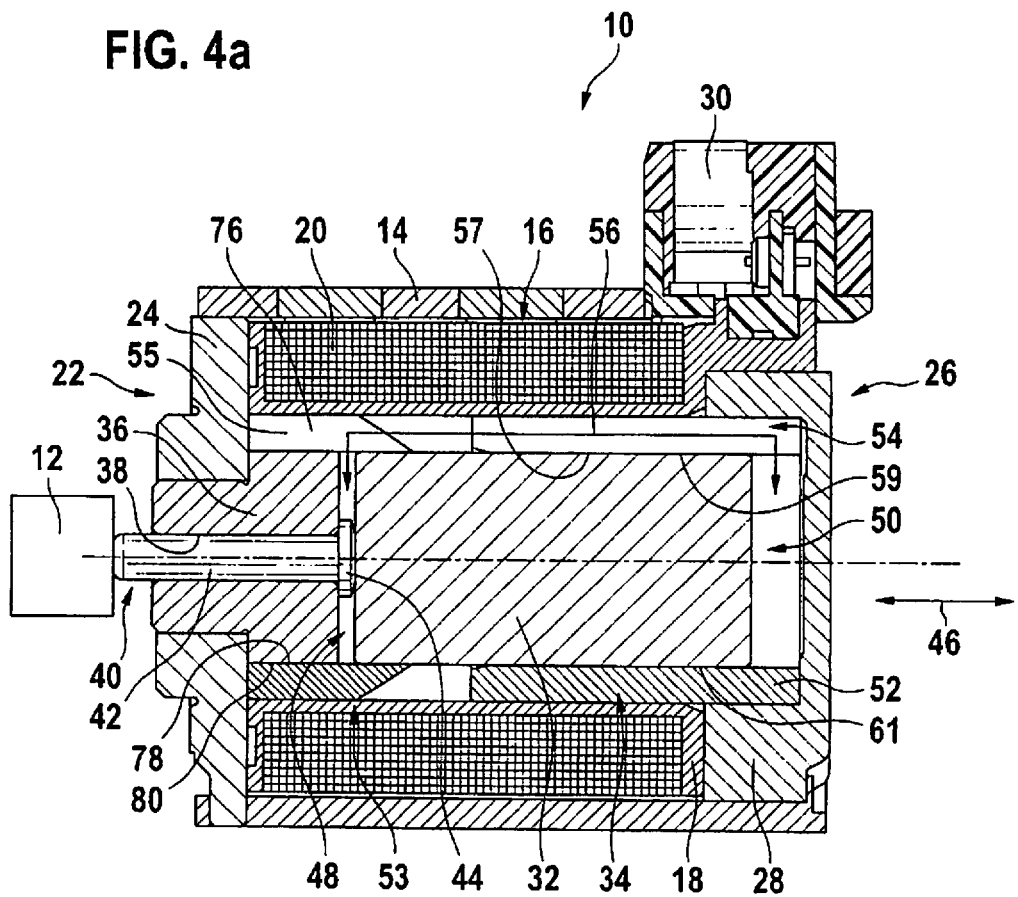
FIG. 4a schematically illustrates a cross-section of a version of the electromagnetic actuating device according to an example embodiment of the present invention.
Figure 4B:
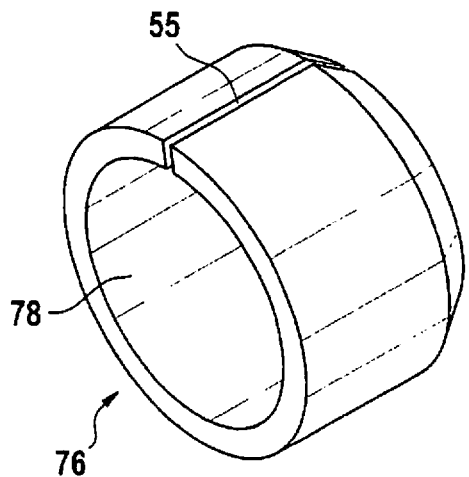
FIG. 4b illustrates a pole sleeve of the actuating device according to an example embodiment of the present invention.

FIGS. 4a-4b show an embodiment of electromagnetic actuating device 10, which largely corresponds to the example embodiment described in FIGS. 1a-2c (identical or functionally equivalent elements have been provided with the same reference numerals). In the embodiment according to FIGS. 4a-4b, a pole core 36 has a separate pole sleeve 76, which is situated radially outside pole core 36 and at least partially surrounds pole core 36 (multi-part development; see FIG. 4a). Pole sleeve 76 rests via its inner circumference 78 against outer circumference 80 of pole core 36. At least in a section 53 facing armature 32, pole sleeve 76 has a groove 55 that is aligned with channel 54 of sleeve 32. Groove 55 can optionally be developed as a longitudinal slot 55 that extends across the entire length of pole sleeve 76. Pole sleeve 76 is separately shown in FIG. 4b.

What is claimed is:

1. An electromagnetic actuating device comprising:
a sleeve formed of a wall in which a channel extends along a longitudinal direction between a front axial side of the sleeve and a back axial side of the sleeve;
an electromagnetic coil situated radially outside the sleeve; and
an armature that is situated radially inside the sleeve and that includes (a) a first axial end face that is at a first end of the armature and that faces forward and (b) a second axial end face that is at a second end of the armature opposite the first end and that faces rearward, wherein:
the channel forms a fluid connection between a chamber in front of the first axial end face and a chamber behind the second axial end face; and
the armature does not include any interior space through which the fluid can flow between the chambers.

2. The electromagnetic actuating device of claim 1, wherein the wall includes a longitudinal slot opening between free ends of the wall that are perpendicular to the first and second axial end faces, the slot opening forming a portion of the channel.

3. The electromagnetic actuating device of claim 1, further comprising an inner sleeve arranged radially between the sleeve and the armature, the inner sleeve formed of a wall in an axial section of which extends an axial slot that is aligned with the channel.

4. The electromagnetic actuating device of claim 3, wherein an inner circumference of the inner sleeve is at least partially provided with a glass cloth foil coated with PTFE for guidance of the armature.

5. The electromagnetic actuating device of claim 3, wherein an inner circumference of the inner sleeve is at least partially provided with a magnetically non-conductive coating.

6. The electromagnetic actuating device of claim 5, wherein the magnetically non-conductive coating is a nickel layer or a nickel-phosphorus layer.

7. The electromagnetic actuating device of claim 3, wherein an inner circumference of the inner sleeve is completely provided with a magnetically non-conductive coating.

8. The electromagnetic actuating device of claim 3, wherein an inner circumference of the inner sleeve is completely provided with a glass cloth foil coated with PTFE for guidance of the armature.

9. The electromagnetic actuating device of claim 1, wherein the sleeve is secured in the actuating device in a torsion-resistant manner such that the channel is situated, relative to a force of gravity, above or below the armature.

10. The electromagnetic actuating device of claim 1, wherein an inner circumference of the sleeve is at least partially provided with a glass cloth foil coated with PTFE for the guidance of the armature.

11. The electromagnetic actuating device of claim 1, wherein an inner circumference of the sleeve is completely provided with a glass cloth foil coated with PTFE for the guidance of the armature.

12. The electromagnetic actuating device of claim 1, wherein at least one of an inner circumference of the sleeve and an outer circumference of the armature is at least partially provided with a magnetically non-conductive coating.

13. The electromagnetic actuating device of claim 12, wherein the magnetically non-conductive coating is a nickel layer or a nickel-phosphorus layer.

14. The electromagnetic actuating device of claim 1, wherein the sleeve is formed from magnetically conductive, unalloyed steel.

15. The electromagnetic actuating device of claim 14, wherein the magnetically conductive, unalloyed steel has a carbon content of less than 0.15% by mass.

16. An electromagnetic actuating device comprising:
a sleeve formed of a wall in which a channel extends along a longitudinal direction of the sleeve;
an electromagnetic coil situated radially outside the sleeve; and
an armature that is situated radially inside the sleeve and that includes a first armature axial end face at a first end of the armature and a second armature end face at a second end of the armature that is opposite the first end, wherein the channel forms a fluid connection between the armature end faces;
wherein electromagnetic actuating device has at least one of the following two features (1)-(2):
(1) the channel has a first channel cross-section, which, in an axial direction, regionally tapers to a second channel cross-section; and
(2) the electromagnetic actuating device further includes a pole core and the electromagnetic actuating device additionally has at least one of the following two features (i)-(ii):
(i) the pole core is axially adjacent to the armature and has a groove (a) that is in a section of the pole core facing the armature and (b) that is aligned with the channel of the sleeve; and
(ii) the electromagnetic actuating device further includes a pole sleeve that is radially exterior to, and at least regionally surrounds, the pole core, and, in a section of the pole sleeve that faces the armature, there is a groove that is aligned with the channel of the sleeve.

17. The electromagnetic actuating device of claim 16, wherein the channel has the first channel cross-section, which, in the axial direction, regionally tapers to the second channel cross-section.

18. The electromagnetic actuating device of claim 16, wherein the electromagnetic actuating device further comprises the pole core that is axially adjacent to the armature and that has groove in the section of the pole core facing the armature, the groove being aligned with the channel of the sleeve.

19. The electromagnetic actuating device of claim 16, wherein the electromagnetic actuating device further comprises:
the pole core; and
the pole sleeve (a) that is radially exterior to, and at least regionally surrounds, the pole core and (b) in the section of which that faces the armature, there is the groove that is aligned with the channel of the sleeve.

20. An electromagnetic actuating device comprising:
a sleeve formed of a tubular wall in which a channel extends along a longitudinal direction of the sleeve;
an electromagnetic coil situated radially outside the sleeve; and
an armature that is situated (a) radially inside the tubular wall of the sleeve and (b) axially between (1) a first chamber that is in front of the armature so that a front facing end face of the armature forms a rear wall of the first chamber and (2) a second chamber that is behind the armature so that a rear facing end face of the armature forms a front wall of the second chamber, wherein the armature is axially movable in a forward direction and in a rearward direction, thereby changing respective volumes of the first and second chambers, wherein the channel forms a fluid flow path by which:
in response to a shrinkage of the volume of the first chamber due to the axial movement of the armature in the forward direction, fluid in the first chamber flows radially outward from in front of the armature in the first chamber into the channel of the tubular wall of the sleeve, then rearward within the channel to a rear position of the sleeve, and then radially inward from the rear position of the channel into the second chamber behind the armature, the fluid thereby flowing out from the first chamber into the second chamber without any of the fluid being passable through the armature; and
in response to a shrinkage of the volume of the second chamber due to the axial movement of the armature in the rearward direction, fluid in the second chamber flows radially outward from behind the armature in the second chamber into the channel of the tubular wall of the sleeve, then forward within the channel to a forward position of the channel, then radially inward from the forward position of the channel into the first chamber in front of the armature, the fluid thereby flowing out from the second chamber into the first chamber without any of the fluid being passable through the armature.

* * * * *